United States Patent
Bardalai (10) Patent No.: US 7,986,623 B2
(45) Date of Patent: Jul. 26, 2011

(54) SYSTEM AND METHOD FOR REJECTING A REQUEST TO ALTER A CONNECTION

(75) Inventor: Snigdho Chandra Bardalai, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 727 days.

(21) Appl. No.: 11/764,525

(22) Filed: Jun. 18, 2007

(65) Prior Publication Data

US 2008/0112322 A1 May 15, 2008

Related U.S. Application Data

(60) Provisional application No. 60/829,660, filed on Oct. 16, 2006.

(51) Int. Cl.
*H04L 12/28* (2006.01)

(52) U.S. Cl. ......................... 370/230; 370/235

(58) Field of Classification Search .................. 370/389, 370/228, 338; 709/238, 227; 714/4; 455/452
See application file for complete search history.

(56) References Cited

U.S. PATENT DOCUMENTS

| | | | |
|---|---|---|---|
| 5,646,936 A * | 7/1997 | Shah et al. ................ | 370/228 |
| 5,859,959 A | 1/1999 | Kimball et al. .......... | 395/182.02 |
| 6,701,448 B1 * | 3/2004 | Akyol et al. .................... | 714/4 |
| 6,718,387 B1 | 4/2004 | Gupta et al. ................ | 709/226 |
| 6,738,624 B1 * | 5/2004 | Aksentijevic et al. ...... | 455/452.1 |
| 7,174,387 B1 * | 2/2007 | Shand et al. ................ | 709/238 |
| 7,269,132 B1 | 9/2007 | Casey et al. ................ | 370/219 |
| 2003/0137932 A1 | 7/2003 | Nishioka et al. .......... | 370/216 |
| 2003/0233456 A1 * | 12/2003 | Shew et al. ................ | 709/227 |
| 2004/0015590 A1 * | 1/2004 | Nagami et al. ............. | 709/227 |
| 2004/0057724 A1 | 3/2004 | Oksanen et al. ............ | 398/5 |
| 2004/0120705 A1 | 6/2004 | Friskney et al. ............ | 398/5 |
| 2005/0089027 A1 | 4/2005 | Colton ....................... | 370/380 |
| 2006/0092932 A1 * | 5/2006 | Ghosh et al. ............... | 370/389 |
| 2007/0198710 A1 | 8/2007 | Gopalakrishnan ......... | 709/225 |
| 2008/0008168 A1 | 1/2008 | Nadeau et al. ............. | 370/389 |
| 2008/0101413 A1 | 5/2008 | Bardalai ..................... | 370/474 |
| 2008/0107415 A1 | 5/2008 | Bardalai ..................... | 398/58 |
| 2008/0170857 A1 | 7/2008 | Bardalai ..................... | 398/59 |
| 2008/0219156 A1 | 9/2008 | Caviglia et al. ............ | 370/228 |
| 2009/0052415 A1 * | 2/2009 | Ishii et al. .................. | 370/338 |

OTHER PUBLICATIONS

Ohuchi, et al., Metro SONET System Supporting Optical Backbone Infrastructure: Flashwave 4500, *Fujitsu Sci. Tech. J.*, 42,4, p. 454-459 (Oct. 2006).

(Continued)

*Primary Examiner* — Kwang B Yao
*Assistant Examiner* — Syed M Bokhari
(74) *Attorney, Agent, or Firm* — Baker Botts L.L.P.

(57) ABSTRACT

A method for rejecting a request to alter a connection includes establishing a first connection with a first node and a second connection with a second node. The second connection passes through the first node and has an associated first end-to-end state. The method also includes transmitting, for relay by the first node to the second node, a first request to alter the second connection with the second node so that the second connection will have an associated second end-to-end state. The method additionally includes receiving a rejection message from the first node indicating that the first request to alter the second connection failed. The method further includes transmitting a second request to alter the second connection with the second node to ensure that the second connection is again in the associated first end-to-end state.

13 Claims, 3 Drawing Sheets

OTHER PUBLICATIONS

*SONET Telecommunications Standard Primer*, www.tektronix.com/optical.

Berger, L., Editor, Editor, *Generalized Multi-Protocol Label Switching (GMPLS) Signaling Resources ReserVation Protocol-Traffic Engineering (RSVP-TE) Extensions*; Movaz Networks, Jan. 2003. Network Working Group, Request for Comments: 3473, Category: Standards Track.

Lang, J., *Link Management Protocol (LMP)*, Sonos, Inc., Oct. 2005. Network Working Group, Request for Comments: 4204, Category: Standards Track.

Bardalai, et al., *System and Method for Providing Support for Multiple Control Channels*, U.S. Appl. No. 11/763,930, filed Jun. 15, 2007.

Bardalai, *System and Method for Discovering Neighboring Nodes*, U.S. Appl. No. 11/764,507, filed Jun. 18, 2007.

Bardalai, *System and Method for Establishing Protected Connections*, U.S. Appl. No. 11/852,580, filed Sep. 10, 2007.

\* cited by examiner

SYSTEM AND METHOD FOR REJECTING A REQUEST TO ALTER A CONNECTION

CROSS REFERENCE TO RELATED APPLICATIONS

This application claims the benefit of priority under 35 U.S.C. §119(e) of U.S. Provisional Application Ser. No. 60/829,660 filed Oct. 16, 2006 entitled Method and System for Rejection of RSVP-TE Tunnel Deletion and Modification Requests.

TECHNICAL FIELD

This invention relates generally to the field of communication networks and more specifically to a system and method for rejecting a request to alter a connection.

BACKGROUND

An optical network uses optical signals to communicate information among the nodes of the network. This information often includes both data (e.g., a file that is being downloaded, packets carrying voices of a phone call, or the contents of a webpage) and signaling (e.g., commands or messages between nodes containing status or setup information). In some optical networks the data may be transferred using a data channel (e.g., a datalink) while the signaling is communicated using a control channel. The connections that carry both the data and the signaling may, at times, need to be modified. For example, a connection may need to be deleted. Currently, protocols, such as Resource Reservation Protocol-Traffic Engineering (RSVP-TE), do not clearly specify procedures for the rejection of a request to alter a connection. In certain situations this may lead to stranded resources and may prevent consistent end-to-end connections. Instead of dealing with the problem of not being able to reject the request, various standards bodies are attempting to address the side effects of the failure with complex protocol extensions. For example, protocol extensions to cleanup stranded resources where there is a loss of communications.

SUMMARY OF THE DISCLOSURE

Particular embodiments provide a system and method for rejecting a request to alter a connection that substantially eliminates or reduces at least some of the disadvantages and problems associated with previous methods and systems.

In accordance with a particular embodiment, a method for rejecting a request to alter a connection includes establishing a first connection with a first node and a second connection with a second node. The second connection passes through the first node and has an associated first end-to-end state. The method also includes transmitting, for relay by the first node to the second node, a first request to alter the second connection with the second node so that the second connection will have an associated second end-to-end state. The method additionally includes receiving a rejection message from the first node indicating that the first request to alter the second connection failed. The method further includes transmitting a second request to alter the second connection with the second node to ensure that the second connection is again in the associated first end-to-end state.

In accordance with another embodiment, a method for rejecting a request to alter a connection includes establishing a first connection with a first node and a second connection with a second node. The first node and the second node have established a third connection with each other. The third connection has an associated first end-to-end state. The method also includes receiving from the first node a first request to alter the third connection between the first node and the second node so that the third connection will have an associated second end-to-end state. Furthermore, the method includes transmitting the first request to the second node. Upon determining that the first request failed, the method also includes transmitting a rejection message to the first node indicating that the first request to alter the third connection failed. The method additionally includes receiving a second request to alter the third connection between the first node and the second node to ensure that the third connection is again in the associated first end-to-end state.

In accordance with yet another embodiment, a method for rejecting a request to alter a connection includes establishing a first connection with a first node and a second connection with a second node. The first node and the second node have established a third connection with each other. The method additionally includes transmitting a first request to alter the third connection between the first node and the second node. The method also includes, upon a first amount of time after the first request was transmitted having elapsed without receiving a response from the first node, transmitting a second request to alter the third connection between the first node and the second node. The method further includes receiving a response from the first node indicating the first node is able to comply with the requested alteration.

In accordance with another embodiment, a system for rejecting a request to alter a connection includes an interface operable to establish a first connection with a first node and a second connection with a second node. The second connection passes through the first node and has an associated first end-to-end state. The system also includes a processor coupled to the interface and operable to transmit, for relay by the first node to the second node, a first request to alter the second connection with the second node so that the second connection will have an associated second end-to-end state. The interface is further operable to receive a rejection message from the first node indicating that the first request to alter the second connection failed. The processor is further operable to transmit a second request to alter the second connection with the second node to ensure that the second connection is again in the associated first end-to-end state.

In accordance with yet another embodiment, a system for rejecting a request to alter a connection includes an interface operable to establish a first connection with a first node and a second connection with a second node. The first node and the second node have established a third connection with each other. The third connection has an associated first end-to-end state. The interface is also operable to receive from the first node a first request to alter the third connection between the first node and the second node so that the third connection will have an associated second end-to-end state. The system also includes a processor coupled to the interface and operable to transmit the first request to the second node. The processor is further operable to, upon determining that the first request failed, transmit a rejection message to the first node indicating that the first request to alter the third connection failed. The interface is further operable to receive a second request to alter the third connection between the first node and the second node to ensure that the third connection is again in the associated first end-to-end state.

In accordance with another embodiment, a system for rejecting a request to alter a connection includes an interface operable to establish a first connection with a first node and a second connection with a second node. The first node and the second node have established a third connection with each other. The system also includes a processor coupled to the interface and operable to transmit a first request to alter the third connection between the first node and the second node. The processor is also operable to, upon a first amount of time after the first request was transmitted having elapsed without receiving a response from the first node, transmit a second request to alter the third connection between the first node and the second node. The interface is further operable to receive a response from the first node indicating the first node is able to comply with the requested alteration.

Technical advantages of particular embodiments include providing a node with a way to reject a request to alter a connection that reduces or avoids stranding resources resulting from the altered connection.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
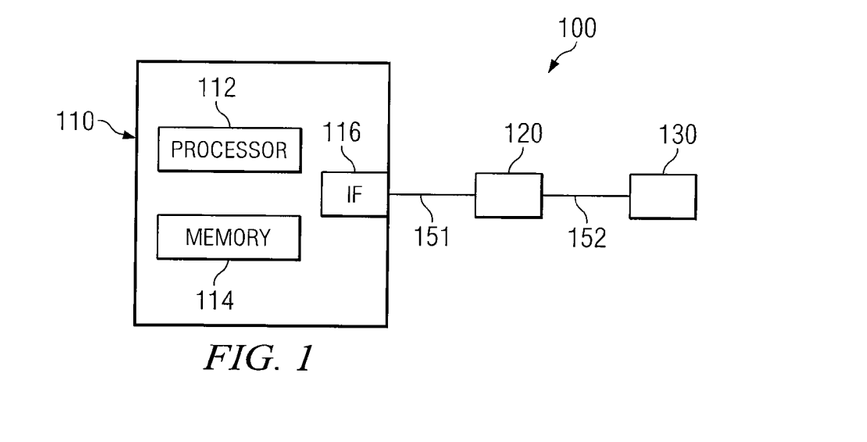
FIG. 1 is a block diagram illustrating an example embodiment of a node coupled to two other nodes.

FIG. 1 is a block diagram illustrating an example embodiment of a node coupled to two other nodes. Nodes 110, 120 and 130 are physically coupled to one another via links 151 and 152 to form network 100. In addition, nodes 110, 120 and 130 may also be logically coupled to one another via connections (not depicted). A connection may represent a pairing of interfaces associated with two different nodes. The connection between two nodes may be irrespective of the links or physical coupling of the nodes. For example, there may be a connection between node 110 and 130 even though they are not directly coupled to each other. Thus, node 110 may be able to send messages to node 130. Any messages sent from node 110 to node 130 via the connection would pass through node 120. These connections allow nodes 110, 120 and 130 to communicate both data, such as files or WebPages, and signaling, such as control messages, routing messages, and link management messages, between each other using links 151 and 152. Data and signaling may be referred to collectively as messages. Because node 120 is between nodes 110 and 130, it may operate as a relay, passing on messages from one node to the other.

In certain situations one of nodes 110, 120 or 130 may desire to alter its connection with one of the other nodes. The alteration may range from deleting the connection to performing various administrative modifications to the connection. However, for any of a variety of reasons the requested alteration may be rejected. For example, the requested alteration may need to be rejected for operational needs (e.g., loss of communications, damage to a link, or controller failure) or for administrative reasons (e.g., graceful shutdown of the controller during software upgrades, placing a resource in a test mode which prevents it from being modified or released, or manual protection switch modes). Unfortunately, current protocols, such as Resource Reservation Protocol-Traffic Engineering (RSVP-TE), do not clearly specify the procedures to be used to reject a request to alter a connection. This may lead to resources being stranded. To avoid stranding resources particular embodiments may allow nodes 110, 120 and 130 to reject a request to alter a connection if they determine that the requested alteration has failed or otherwise cannot be complied with. Upon receiving the rejection the node that originally sent the alteration request may return to is original state (e.g., its state before it attempted the alteration). Furthermore, in some embodiments, the node that originally requested the alteration may send an additional request requesting that the connection revert back to its original state. This may help to ensure a consistent end-to-end state for a connection even if an intermediary node along the path used by the connection initially makes a change in response to the requested alteration.

Network 100 may be any type of network employing any suitable topology, such as a ring network, a star network, a bus network, a mesh network, or any other type of network that may be desired. For example, if network 100 was a ring network it may use a unidirectional path-switched ring (UPSR) topology or a bidirectional line switched ring (BLSR) topology. Furthermore, network 100 may utilize protocols such as Resilient Packet Ring (RPR) protocols. An RPR protocol may refer to a protocol for ring-based packet transport, where packets are added, passed through, or dropped at each node (e.g. node 110). According to some embodiments, network 100 may utilize any suitable transmission technique, such as Ethernet, Synchronous Optical Network (SONET), or wavelength division multiplexing (WDM) techniques (e.g. dense wavelength division multiplexing (DWDM)). In addition, network 100 may employ RSVP-TE and/or synchronous transport signal (STS). In some embodiments, network 100 may communicate information in packets. A packet may comprise a bundle of data organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets. One or more packets may be organized within a frame in a specific way for transmission.

Packets or frames may be communicated within portions of network 100 using an optical signal transmitted as light pulses. As an example, an optical signal may have a frequency of approximately 1550 nanometers and a data rate of 10, 20, 40, or over 40 gigabits per second. These light pulses may travel through any type of fiber suitable to transmit a signal. According to one embodiment, the fiber may include an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

Network 100 may comprise, or be a part of, a local area network (LAN), a wide area network (WAN), a cellular network, a global distributed network such as the Internet, an Intranet, an Extranet, a radio network (RN), a CDMA network, a GSM network, a TDMA network, a satellite network or any other form of wireless or wireline networking.

Nodes 110, 120 and 130 may be referred to as network entities and may include any suitable type of networking device such as a cross connect, a database, a regenerating unit, dense wavelength division multiplexers (DWDMs), access gateways, endpoints, softswitch servers, trunk gateways, access service providers, Internet service providers, or any other device operable to route packets to, from or within network 100. For simplicity, only node 110's internal components have been depicted. In other embodiments, node 110 may comprise more or fewer internal components, and one or more of the components may be external to node 110. Nodes 120 and 130 may comprise similar components.

Processor 112 may be a microprocessor, controller, or any other suitable computing device, resource, or combination of hardware, software and/or encoded logic operable to provide, either alone or in conjunction with other node 110 components, such as memory 114 and interface 116, node functionality. Such functionality may include providing various features discussed herein to a network, such as network 100. Such features may include generating/interpreting a request to alter a connection. Similarly, processor 112 may also be used in generating/interpreting a rejection of the request to alter the connection. In some embodiments the features implemented by processor 112 may also include a timer. The timer may start when a request is sent and stop when a response is received or after a predetermined amount of time.

Memory 114 may be any form of volatile or non-volatile memory including, without limitation, magnetic media, optical media, random access memory (RAM), read-only memory (ROM), removable media, or any other suitable local or remote memory component. Memory 114 may store any suitable instructions, data or information, including software and encoded logic, utilized by node 110. For example, in some embodiments memory 114 may store any information, data, commands or instructions needed by processor 112 to be able to interpret, process and respond to a rejection message.

Interface 116 may be used in the communication of signaling and/or data between node 110 and nodes 120 and 130. For example, node 110 may receive a rejection message from node 130 via interface 116. The number and type of interfaces 116 included with node 110 may be based on the number and type of networks to which node 110 is coupled. For example, node 110 may be coupled to an optical network and a broadcast network. In such a situation interface 116 may comprise a point-to-point optical interface and a broadcast network interface.

Modifications, additions, or omissions may be made to network 100 without departing from the scope of the invention. The components of network 100 may be integrated or separated according to particular needs. Moreover, the operations of network 100 may be performed by more, fewer, or other devices. Additionally, operations of network 100 may be performed using any suitable logic. As used in this document, "each" refers to each member of a set or each member of a subset of a set.

Figure 2:
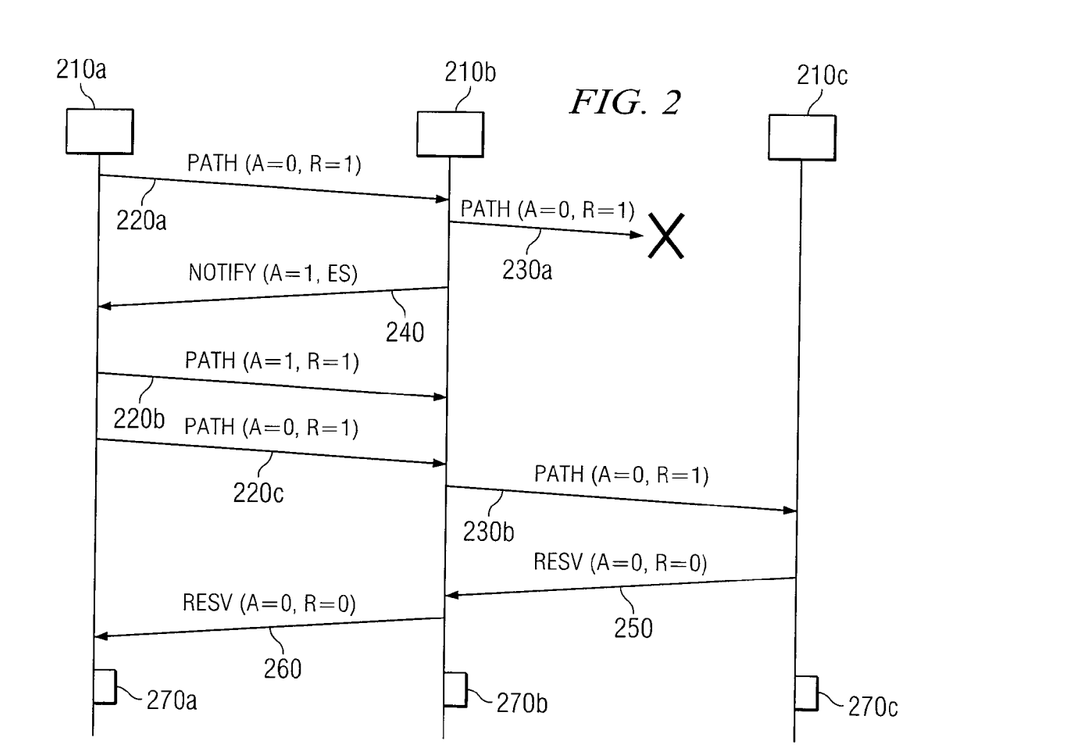
FIG. 2 is a signaling diagram illustrating an example embodiment of signaling between nodes during an administrative modification to a connection.

FIG. 2 is a signaling diagram illustrating an example embodiment of signaling between nodes during an administrative modification to a connection. Nodes 210 may be similar to nodes 110, 120, and 130 described above with respect to FIG. 1. Furthermore, like nodes 110, 120 and 130, nodes 210 may be coupled serially in a point-to-point manner. More specifically, node 210a is directly coupled to node 210b and indirectly coupled to node 210c; node 210b is directly coupled to both nodes 210a and 210c; and node 210c is directly coupled to node 210b and indirectly coupled to node 210a. Thus, any messages sent between nodes 210a and 210c may have to pass through node 210b before arriving at its final destination.

While in practice nodes within a network may send a variety of different signals and messages, for purposes of the signaling diagram depicted in FIG. 2 three different types of signals are used. More specifically, FIG. 2 includes path messages (paths 220 and 230), notify messages (notify 240), and reservation request messages (resv 250 and resv 260). A path message may follow the route used for transmitting data (e.g., the same links and nodes used by the connection). Along the way the path message may create path states in the routers and may enable routers to learn the previous-hop and next-hop node for the session. While in practice a path message may comprise several different fields, only the administrative status bit (or field) and the reflect bit (or field) have been depicted. The administrative status bit may be used to indicate an administrative change such as turning on or turning off alarm monitoring for the specific connection. The reflect bit may be used to indicate that the sending node wants the receiving node to respond with the status of the administrative change being request. A notify message may be used to indicate the failure status of the administrative change from intermediary nodes. Similar to the path message, the notify message may in practice contain several different fields, but only the administrative status bit and the ErrorSpec Type Length Value (TLV) field are depicted. The ErrorSpec TLV field may comprise a value having a certain type of error associated therewith. A resv message may follow the reverse path of the path message. Along the way the resv message may create and maintain a reservation state in each router along the path. Like the path message, only the administrative status bit and the reflect bit are depicted. Assume, for purposes of this signaling diagram, that there is a connection between node 210a and 210c that passes through node 210b. Further assume that the link between node 210b and 210c initially is damaged.

For any of a variety of reasons, such as to turn on or turn off alarm monitoring or to release resources, node 210a may have determined that it wants to modify its connection with node 210c. Accordingly, node 210a first sends path 220a to node 210c via node 210b. Within path 220a the administrative status bit is set to 0 and the Reflect bit is set to 1. While node 210c is the intended recipient, path 220a may first be received by node 210b because the connection between nodes 210a and 210c goes through node 210b Upon receiving path 220a, node 210b may transmit path 220a as path 230a. Path 230a may be similar to path 220a, more specifically, the administrative status bit of path 230a is set to 0 and the reflect bit of path 230a is set to 1. Path 230a is essentially the same message retransmitted by node 210b. However, because the link between nodes 210b and 210c is damaged node 210c may not receive path 230a and thus may not be able to send an acknowledgement message back to node 210b.

After sending path 230a node 210b may wait a predetermined amount of time for an acknowledgement from node 210c. In some embodiments this predetermined amount of time may be long enough to allow adequate time to receive an acknowledgement from node 210c but short enough to allow adequate time for node 210a to receive notify 240 before node 210a times out and assumes that node 210b did not receive path 230a. Upon the expiration of the predetermined amount of time, node 210b may send notify 240 in which a value has been placed in the ErrorSpec TLV field and the administrative status bit has been set to 1.

Once node 210a receives notify 240 it knows that its request to alter the connection with node 210c has failed. This may be because the administrative status bit was set to 1, when node 210a was expecting it to be set to 0. More specifically, the administrative status bit of notify 240 is complimentary of the administrative status bit of path 220a signifying that the requested alteration has been rejected.

Then node 210a may send path 220b with the administrative status bit set to 1 and the Reflect bit set to 1. This may be done to ensure that nodes 210a and 210b revert back to their previous state. In other words, after path 220b is received by node 210b nodes 210a, 210b, and 210c may be back to their original state before path 220a was sent. This may be desirable because nodes 210a and 210b may have made changes in anticipation of the requested alteration. Unfortunately node 210c did not receive path 230a and so may be unaware of the requested modifications. This may cause the resources represented by node 210c to become stranded if nodes 210a and 210b were to have transitioned to the new state while node 210c remained in the old state. Thus, by sending path 220b requesting nodes 210a and 210b revert back to their previous state, all three nodes may be in the previous state (the last state node 210c was aware of) when the link is repaired and node 210c is again connected to node 210b.

Some time after the damaged link has been repaired node 210a sends path 220c which may be similar to path 220a. It should be noted that in some embodiments node 210a may not know when the damaged connection is repaired and thus several path messages may be sent and rejected before one actually gets through. Because the link has been repaired, node 210c may be able to receive path 230b and to respond to it by sending node 210b resv 250. Both the administrative status bit and the Reflect bit of resv 250 may be set 0.

As with path 220, node 210b may forward resv 250 to node 210a as resv 260. Thus, like resv 250, both the administrative status bit and the reflect bit of resv 260 are set to 0. When node 210a receives resv 260 it will know that path 220c was successfully received by node 210c. More specifically, because the administrative status bit is set to 0 (as it was in path 220c sent by node 210a) node 210a knows that node 210c is able to make the requested modification contained within path 220c. Then, at point 270 the requested alteration is performed and all three nodes 210 are in the same state. For example, alarm monitoring may be enabled at all three nodes.

Figure 3:
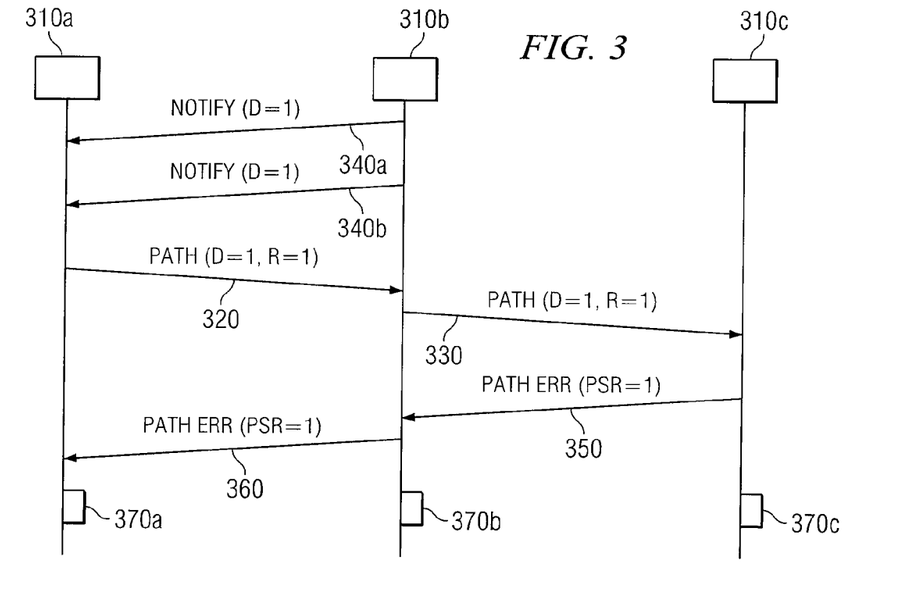
FIG. 3 is a signaling diagram illustrating an example embodiment of signaling between nodes during the deletion of a connection.

FIG. 3 is a signaling diagram illustrating an example embodiment of signaling between node during the deletion of a connection. Nodes 310 may be similar to nodes 110, 120, and 130 described above with respect to FIG. 1. Furthermore, like nodes 110, 120 and 130, nodes 310 may be coupled to one another serially in a point-to-point manner. More specifically, node 310a is directly coupled to node 310b and indirectly coupled to node 310c; node 310b is directly coupled to both nodes 310a and 310c; and node 310c is directly coupled to node 310b and indirectly coupled to node 310a. Thus, any messages sent between nodes 310a and 310c may have to pass through node 310b before arriving at its final destination.

While in practice nodes within a network may send a variety of different signals and messages, for purposes of the signaling diagram depicted in FIG. 3 three different types of signals are used. More specifically, FIG. 3 includes notify messages (notify 340), path messages (path 320 and 330) and PathERR messages (pathErr 350 and 360). The notify message depicted in FIG. 3 may be similar to the notify message described above with respect to FIG. 2. However, for purposes of this signaling diagram only the delete bit is depicted. The delete bit may be used to indicate a request to delete a connection. The path message depicted in FIG. 3 may be similar to the path message described above with respect to FIG. 2. However, for purposes of this signaling diagram the delete bit is depicted instead of the administrative status bit. A PathERR message may be sent when an error occurs with a particular path message. The PathERR message may be sent to the node that sent the path message. The PathERR message may be advisory and thus may not alter the state of the connection. Similar to the other messages the PathERR message may contain several different bits (or fields) but only the path state removed (PSR) bit is depicted. The PSR bit may be used to indicate that a particular path, or portion of a connection, has been removed or deleted. Assume, for purposes of this signaling diagram that the cross-connect of node 310a is temporarily in test mode when notify 340a is first sent and thus is unable to receive notify 340a.

For any of a variety of reasons, such as removal of stranded resources, maintenance at intermediary nodes requiring the removal of all associated resources end-to-end, node 310b may desire to delete a connection. Accordingly, node 310b first sends notify 340a to node 310b. The delete bit of notify 340a is set to 1 indicating that node 310b wants to delete the connection. However, because the cross-connect of node 310a is in a test mode node 310a does not receive notify 340a.

Traditionally, if node 310b did not receive some sort of acknowledgement or response from node 310a within a predetermined amount of time it would begin a forced deletion of the connection. However, in particular embodiments, rather than performing a forced deletion, node 310b may wait for a period of time and then retry sending the notify message. More specifically, after waiting a predetermined amount of time node 310b sends notify 340b. As before with notify 340a, the Delete bit of notify 340b is set to 1 indicating that node 310b wants to delete the connection.

By this time node 310a has finished with its testing and thus is able to receive notify 340b. Upon receiving notify 340b and determining that it is able to comply with the request to delete the connection, node 310a will send path 320; both the Delete bit and the Reflect bit of path 320 are set to 1. Note that the delete bit for both notify 340b and path 320 is set to 1 indicating to node 310b that the request to delete the connection has not been rejected.

When node 310b receives path 320 it sends path 330 to node 310c. Path 330 may be similar to path 320. More specifically, both the Delete bit and the Reflect bit of path 330 are set to 1. When node 310c receives path 330 it replies with PathERR 350 and at point 370c uninstalls the cross-connect associated with the connection, effectively deleting that portion of the connection. PathERR 350 contains a Path State Removed bit which node 310c has set to be 1, indicating that it has uninstalled the cross-connect associated with the connection.

As with path 320, when node 310b receives pathERR 350 it transmits a similar pathERR 360 to node 310a. As with pathERR 350, pathERR 360 contains a Path State Removed bit that has been set to 1 indicating that node 310b has uninstalled the cross-connect associated with the connection. Once node 310b has sent pathERR 360, it uninstalls the cross-connect associated with the connection at point 370b, effectively deleting that portion of the connection. Similarly, once node 310a receives pathERR 360 indicating that node 310b has uninstalled its cross-connect, node 310a may uninstall its cross-connect at point 370a. It should be noted that uninstalling the three cross-connects at points 370 does not affect any other connections between nodes 310. More specifically, deleting the cross-connects associated with the connection between nodes 310*a* and 310*c* may not effect a connection between nodes 310*b* and 310*c* even though it may use the same link.

Figure 4:
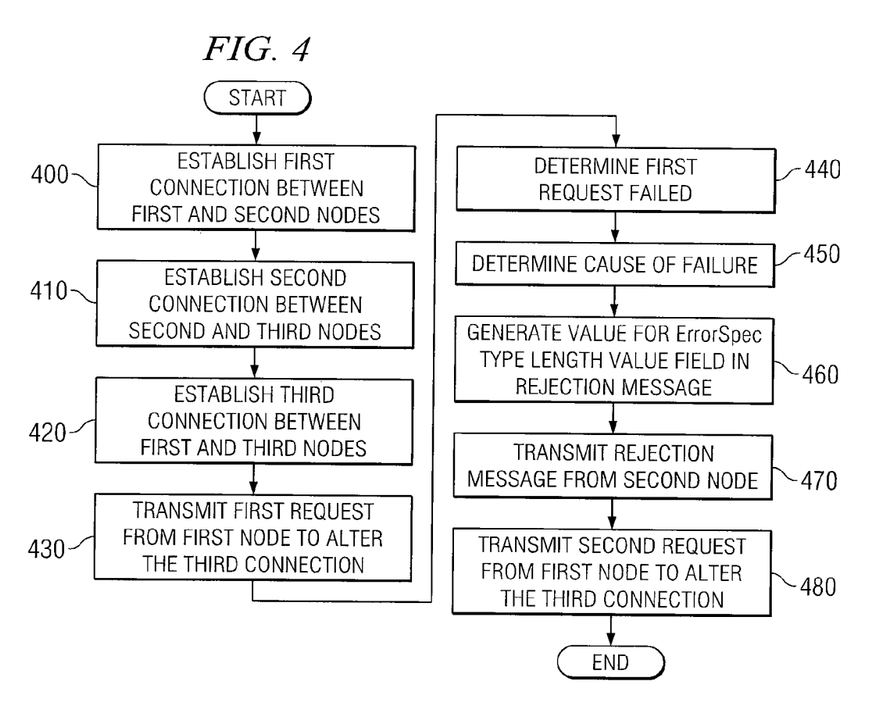
FIG. 4 is a flowchart illustrating an example embodiment of a method for rejecting a request to alter a connection.

FIG. 4 is a flowchart illustrating an example embodiment of a method for rejecting a request to alter a connection. This method may involve three nodes within an optical network, such as nodes 110, 120 and 130 of network 100 depicted in FIG. 1. The method begins with steps 400, 410 and 420 where the three nodes establish connections with one another. More specifically, a first connection is established between a first node and a second node, a second connection is established between the second node and a third node, and a third connection is established between the first node and the third node. Each connection may represent a pairing between interfaces of the respective node. As discussed above a connection between two nodes may involve any number of intermediary links or nodes. Assume that this is the case for the third connection and that the third connection between the first and third nodes passes through the second node.

At step 430 the first node transmits a first request to alter the third connection. The alteration may involve deleting or removing the connection, or performing an administrative modification, such as turning on or turning off alarm monitoring or releasing resources end-to-end. In some embodiments the first request may comprise a path message with the various values entered into various fields based, in part, on the requested alteration. For example, if the first node wants to delete the third connection the path message may be transmitted with the delete bit set to 1. Because the requested alteration is to be made to the third connection, the first request may be relayed by any intermediary nodes along the path used by the third connection. More specifically, the second node may relay the first request to the third node.

After the second node has received the first request and transmitted it to the third node the second node may expect to receive an acknowledgement (ACK) message from the third node indicating that it has received the first request. When the second node does not receive the expected acknowledgement (or if it receives an negative acknowledgement (NACK)) it may determine that the first request has failed. This is shown at step 440. The amount of time the second node may wait for an acknowledgment from the third node may be long enough to allow the third node to respond but short enough to allow the second node to send a rejection message to the first node before the first node resends the first request.

At step 450 the second node determines the cause of the failure. For example, where the second node did not receive the expected ACK message, the second node may determine that the third node is unavailable or the link has been damaged. As another example, if the second node received a NACK message from the third node, then the NACK message may contain a reason why the third node is unable to make the requested alteration.

At step 460 the second node generates a value for the ErrorSpec TLV field which may be included in a rejection message sent to the first node. The ErrorSpec TLV may be an error code which the first node may recognize. The value of the ErrorSpec TLV may be based on the second node's determination of the cause of the failure.

At step 470 the second node transmits a rejection message to the first node. In some embodiments the rejection message may be a notify message. Included within the rejection message may be the value of the ErrorSpec TLV field determined at step 460. The rejection message may also include a value complementary to a value within the first request. For example, if the first request was a path message with the delete bit set to 1, then the rejection message may be a notify message with the delete bit set to 0. This complementary value, along with the value of the ErrorSpec TLV field, may alert the first node that while the first request may have been successfully received the by the second node, the third node was not able to comply.

Because the requested alteration is to the third connection which includes intermediary nodes, it may be important that any nodes or links used along the route or path of the third connection are also modified in accordance with the requested alteration. Unfortunately, when one of the nodes is unable to receive the request, when it becomes available it may be stranded (e.g., the third node may think the third connection exists, while the first and second nodes have deleted it). In order to help prevent this, when the first node receives the rejection message from the second node it may attempt to ensure that any changes, modification or alterations made by any of the nodes along the path used by the third connection return to their previous state. This may allow the third node to return to service or otherwise become able receive messages again, while the connection is still in the state it was before the third node become unavailable. Thus, the end-to-end state of the connection is preserved.

To accomplish this end-to-end consistency, at step 480 the first node transmits a second request to alter the third connection. This second request essentially requests that the third connection revert back to the way it was before the first node sent the first request. As before, this may involve the first node sending a path message. However, this time the delete bit may be set to 0 since the first node is attempting return the third connection to its previous state and no longer wants the connection deleted.

Modifications, additions, or omissions may be made to the method without departing from the scope of the invention. The method may include more, fewer, or other steps. Additionally, steps may be performed in any suitable order without departing from the scope of the invention.

Figure 5:
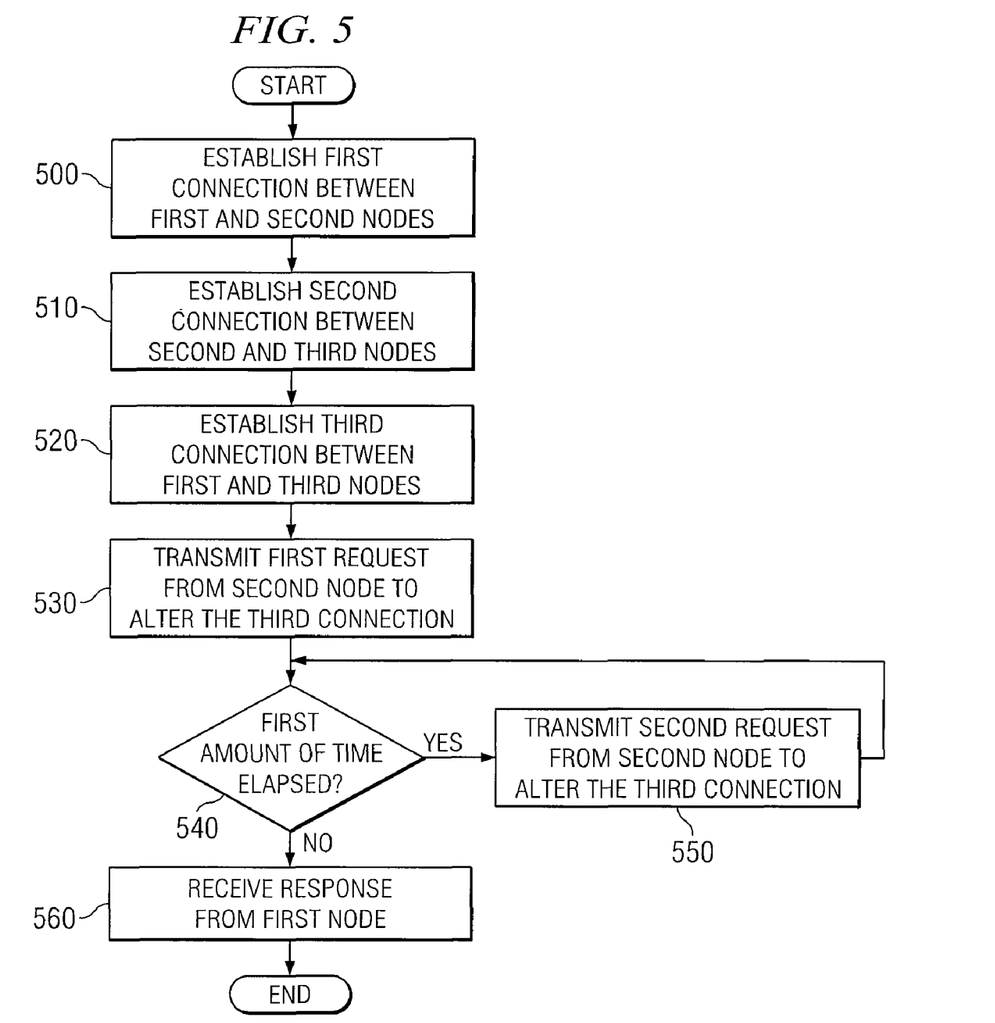
FIG. 5 is a flowchart illustrating another example embodiment of a method for rejecting a request to alter a connection.

FIG. 5 is a flowchart illustrating another example embodiment of a method for rejecting a request to alter a connection. Similar to the method depicted in FIG. 4, this method may involve three nodes within an optical network, such as nodes 110, 120 and 130 of network 100 depicted in FIG. 1. The method begins with steps 500, 510 and 520 where the three nodes establish connections with one another. More specifically, a first connection is established between a first node and a second node, a second connection is established between the second node and a third node, and a third connection is established between the first node and the third node. Each connection may represent a pairing between interfaces of the respective node. As discussed above a connection between two nodes may involve any number of intermediary links or nodes. Assume that this is the case for the third connection and that the third connection between the first and third nodes passes through the second node.

At step 530 the second node transmits a first request to alter the third connection. Because the second node is an intermediary node along the path used by the third connection the request may be different than the request sent by the first node in the method depicted in FIG. 4. More specifically, as opposed to sending a path message, the second node may send a notify message. For example, if the second node wants to make an administrative modification to the third connection it may generate and transmit a notify message in which the administrative status field is set to 0.

In some situations the first node may not be able to receive the first request. For example, the first node may be in a test mode preventing it from being able to send or receive messages to or from other nodes. In a typical optical network, when the first amount of time lapses without a response from the first node the second node may initiate a forced deletion of the third connection. However, because the first node was not able to receive the command deleting the connection, when it becomes available again it will think the third connection is still available while the second and third nodes have deleted the third connection in response to the forced deletion. According to particular embodiments, if at decision step 540 a first amount of time elapses without the second node receiving a response or acknowledgment from the first node then, at step 550, the second node transmits a second request to alter the third connection.

Unlike the second request sent in FIG. 4 that was designed to revert the third connection back to its previous state, the second request transmitted at step 550 may be similar to the first request. More specifically, if the first request comprised a notify message having the administrative status field set to 0, then the second request may similarly comprise a notify message having the administrative status field set to 0.

This cycle of waiting a first amount of time and then retransmitting similar requests may continue until a response from the first node is received at step 560. For example, once the first node finishes performing its tests, it may become available again and would therefore be able to respond to the request form the second node. Regardless of whether the first node is able to respond to the first or the twentieth request from the second node, the response may be the same. This may be because, from the perspective of the first node, this is the first time the second node has sent the request. In certain situations the response may comprise a path message, similar to the path message sent in FIG. 4. Because this message is in response to the request from the second node it may contain similar values in the various corresponding fields of the response. For example, because the administrative status bit of the first request was set to 0, the first node may set the administrative status bit of the response to 0.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. a method for rejecting a request to alter a connection, comprising: establishing a first connection with a first node of a network at a third node of the network; establishing a second connection with a second node of the network at the third node of the network, the second connection passing through the first node and having an associated first end-to-end state; transmitting from the third node, for relay by the first node to the second node, a first request to alter the second connection with the second node so that the second connection will have an associated second end-to-end state, wherein the first request to alter the second connection comprises a first request selected from the group consisting of a request to delete the second connection and a request to perform an administrative modification to the second connection; at the third node, receiving a rejection message from the first node indicating that the first request to alter the second connection failed; and transmitting from the third node a second request to alter the second connection with the second node to revert the second connection back to the associated first end-to-end state in the case that one of the nodes made changes to the end-to-end state in anticipation of the failed request to alter the second connection.

2. The method of claim 1, wherein the rejection message comprises at least one field with a value that is complimentary to a value within at least one corresponding field in the first request.

3. The method of claim 1, wherein the rejection message is received within a first amount of time after the first request was transmitted.

4. The method of claim 1, wherein the rejection message comprises an ErrorSpec Type Length Value field having a first value.

5. A method for rejecting a request to alter a connection, comprising: establishing a first connection with a first node of a network at a third node of the network and establishing a second connection with a second node of the network at the third node of the network, wherein the first node and the second node have established a third connection with each other, the third connection having an associated first end-to-end state; at the third node, receiving from the first node a first request to alter the third connection between the first node and the second node so that the third connection will have an associated second end-to-end state, wherein the first request to alter the third connection comprises a first request selected from the group consisting of a request to delete the third connection and a request to perform an administrative modification to the third connection; transmitting the first request to the second node from the third node; upon determining that the first request failed, transmitting from the third node a rejection message to the first node indicating that the first request to alter the third connection failed; and at the third node, receiving a second request to alter the third connection between the first node and the second node to revert the third connection back to the associated first end-to-end state in the case that one of the nodes made changes to the end-to-end state in anticipation of the failed request to alter the third connection.

6. The method of claim 5: further comprising:
determining the cause of the failure of the first request; and
generating a value to be used with an ErrorSpec Type Length Value field in the rejection message; and
wherein transmitting a rejection message to the first node comprises transmitting a rejection message with the value in the ErrorSpec Type Length Value field to the first node.

7. A system for rejecting a request to alter a connection, comprising: an interface operable to: establish a first connection with a first node; and establish a second connection with a second node, the second connection passing through the first node and having an associated first end-to-end state; and
a processor coupled to the interface and operable to transmit, for relay by the first node to the second node, a first request to alter the second connection with the second node so that the second connection will have an associated second end-to-end state, wherein the first request to alter the second connection comprises a first request selected from the group consisting of a request to delete the second connection and a request to perform an administrative modification to the second connection; and wherein: the interface is further operable to receive a rejection message from the first node indicating that the first request to alter the second connection failed; and the processor is further operable to transmit a second request to alter the second connection with the second node to revert the second connection back to the associated first end-to-end state in the case that one of the nodes made changes to the end-to-end state in anticipation of the failed request to alter the second connection.

8. The system of claim 7, wherein the rejection message comprises at least one field with a value that is complimentary to a value within at least one corresponding field in the first request.

9. The system of claim 7, wherein the rejection message is received within a first amount of time after the first request was transmitted.

10. The system of claim 7, wherein the rejection message comprises an ErrorSpec Type Length Value field having a first value.

11. The system of claim 7, wherein the first request to alter the second connection comprises a first request selected from the group consisting of a request to delete the second connection and a request to perform an administrative modification to the second connection.

12. A system for rejecting a request to alter a connection, comprising: an interface operable to: establish a first connection with a first node and establishing a second connection with a second node, wherein the first node and the second node have established a third connection with each other, the third connection having an associated first end-to-end state; and receive from the first node a first request to alter the third connection between the first node and the second node so that the third connection will have an associated second end-to-end state, wherein the first request to alter the third connection comprises a first request selected from the group consisting of a request to delete the third connection and a request to perform an administrative modification to the third connection; and a processor coupled to the interface and operable to: transmit the first request to the second node; and upon determining that the first request failed, transmit a rejection message to the first node indicating that the first request to alter the third connection failed; and wherein the interface is further operable to receive a second request to alter the third connection between the first node and the second node to revert the third connection back to the associated first end-to-end state in the case that one of the nodes made changes to the end-to-end state in anticipation of the failed request to alter the third connection.

13. The system of claim 12 wherein:
the processor is further operable to:
determine the cause of the failure of the first request; and
generate a value to be used with an ErrorSpec Type Length Value field in the rejection message; and
wherein the processor operable to transmit a rejection message to the first node comprises a processor operable to transmit a rejection message with the value in the ErrorSpec Type Length Value field to the first node.

* * * * *